United States Patent Office 3,429,225
Patented Feb. 25, 1969

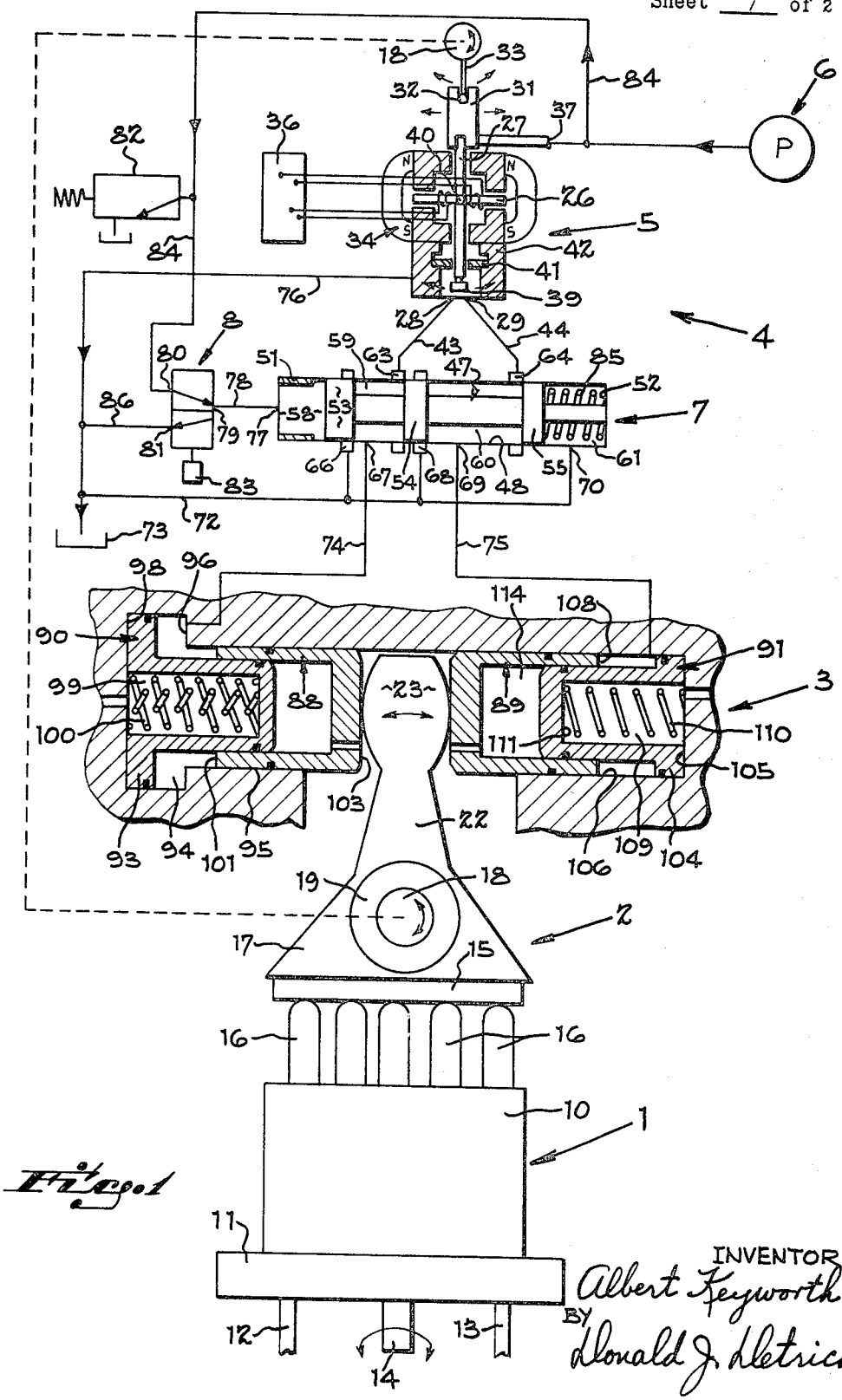

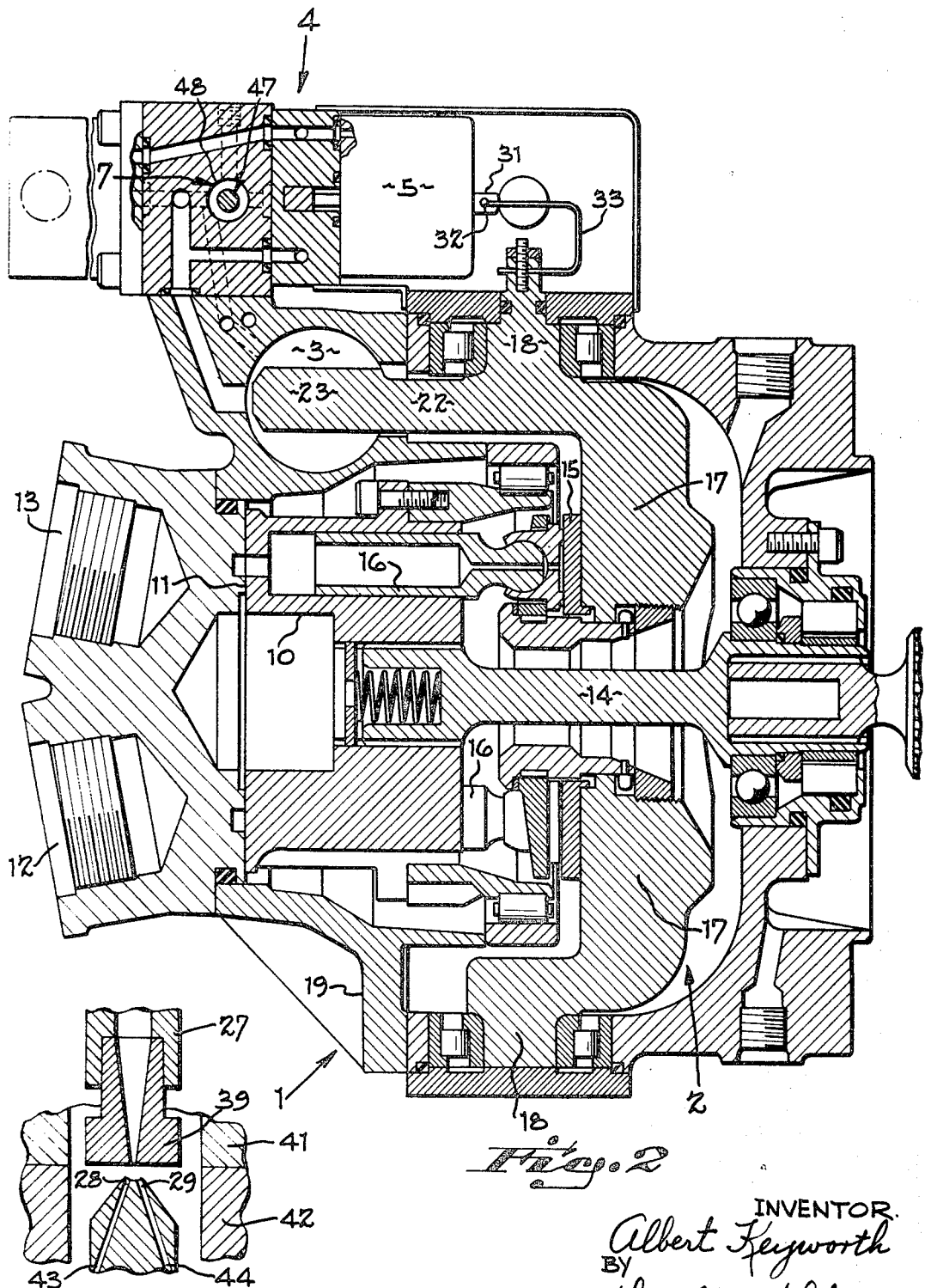

3,429,225
ELECTROHYDRAULIC DISPLACEMENT CONTROL
WITH MECHANICAL FEEDBACK
Albert Keyworth, Camarillo, Calif., assignor to Abex
Corporation, New York, N.Y., a corporation of
Delaware
Filed June 9, 1966, Ser. No. 556,379
U.S. Cl. 91—3                                      11 Claims
Int. Cl. F15b *13/16, 5/00;* F04b *1/02*

ABSTRACT OF THE DISCLOSURE

The displacement of a variable volume pump or motor is controlled by a servovalve of the jet discharge type having a movable jet tube which is responsive to an electrical input to establish a pressure differential between a pair of fluid lines in accordance with the magnitude of the electrical signal. The pressure differential is applied to operate opposed hydraulic motors which position the displacement changing means of the pump or motor. A resilient feedback spring is connected mechanically from the displacement changing means to the jet tube, and as the displacement changing means is moved by the hydraulic motors, the spring increasingly urges the jet tube toward its null position. Shut-off valve means are responsive to loss of a hydraulic actuating pressure to block flow from the servovalve to the hydraulic motors and to release pressure fluid acting on the fluid motors in case of pressure failure.

---

This invention relates to means for controlling the displacement or volume of fluid passing per unit time through a variable volume hydraulic fluid pressure energy translating device having movable displacement changing means. More particularly, the invention relates to a displacement control which operates in accordance with the magnitude of an electrical control signal and which is responsive to a mechanical feedback signal from the controlled pump or motor.

The displacement control of this invention may be utilized to operate the displacement changing means of hydraulic pumps and motors wherein the displacement changing means is positionable by a fluid motor, piston, or ram. For example, the controlled device may comprise a variable volume pump or motor which is of the vane type or which is of the axial piston type. For purposes of illustration, the invention is primarily described hereinafter as used to control the displacement of a variable volume axial piston pump having a trunnion-mounted hanger or swash plate which is angularly adjustable with respect to the axis of the cylinder barrel.

It has been a primary objective of the inventor to provide a displacement servocontrol which is responsive to an electrical signal to selectively adjust the magnitude and the direction of fluid flow through the controlled device, and which is small in size yet characterized by high reliability and precision of operation, and which avoids transducing a position or rate feedback signal into an electrical signal. In this connection it is noted that the control of the present invention is particularly intended for use on aircraft wherein weight, size and reliability are critical factors.

The displacement control of this invention preferably includes a jet discharge electrohydraulic servovalve of the type wherein a fluid jet from a nozzle is divided into two fluid streams having a static pressure differential between them related to the magnitude and direction of an electrical control signal applied to the servovalve. Pressure fluid for operating the servovalve and the controlled device is supplied from a pressure source or pilot pump which may be incorporated as a part of the controlled device itself. The servovalve adjustably divides the jet of fluid issuing from the jet nozzle between two receptor ports which are connected, through a by-pass or shut-off valve, to a pair of opposed balanced area hydraulic rams by which the hanger or other movable displacement changing means of the pump or motor can be positioned. The application of an electrical signal of given magnitude to the servovalve directs pressure fluid from the jet nozzle toward one or the other of the hydraulic rams, and the resulting difference in static pressure develops a force which causes the displacement changing means to move at a rate proportional to the magnitude of the electrical signal. Movement of the displacement changing means continues, increasing or decreasing the volume of flow per unit time or changing the sense of the flow, so long as the jet impinges unequally between the two receptor ports.

A mechanical feedback force reflecting the instantaneous position of the displacement changing means is applied directly to the jet tube of the servovalve in a direction opposing the electromagnetic forces acting to displace the jet tube from centered position between its receiver ports. As the displacement changing means is moved the mechanical feedback force increases or decreases accordingly, and ultimately the mechanical feedback force equals the electromagnetic control force and restores the jet tube to a centered position in which the jet stream is divided equally between the two receptor ports. Movement of the displacement changing means thereupon stops at a position correlated to the magnitude of the input electrical control signal.

The shut-off valve through which the two fluid streams must pass on their paths from the servovalve to the fluid motors for operating the displacement changing means, renders the system failsafe against either electrical or hydraulic control system failure. This valve is biased toward closed position by a spring force in opposition to the hydraulic control pressure force, so that if there is failure of the hydraulic control system, the valve automatically moves to shut off the streams from the servovalve and to direct any spool leakage to tank. Pressure on the fluid motors operating the displacement changing means is simultaneously releived, and the hanger is spring urged to the center (no displacement) position.

The application of hydraulic system pressure to maintain the shut-off valve in open position is controlled by a solenoid operated valve. In the event of electrical system failure the solenoid valve operates to release the hydraulic system pressure on the shut-off valve, again causing the valve to move to a position shutting off the flow from the servovalve and causing the displacement changing means to be restored to a centered or no displacement position.

The invention can best be further described in relation to the accompanying drawings, in which:

FIGURE 1 is a diagrammatic illustration of a hydraulic system including a variable displacement axial piston pump and control means in accordance with a preferred embodiment of this invention for operating the displacement changing means of the pump.

FIGURE 2 is an axial section through an aircraft axial piston pump which is fitted with a displacement control in accordance with this invention.

FIGURE 3 is an enlarged fragmentary vertical section of the jet tube nozzle and the receptor ports of the jet discharge servovalve.

Referring to the drawings, the numeral 1 designates a variable volume axial piston pump of known type with which the invention is suitable for use, the pump 1 being shown diagrammatically in FIGURE 1 and in section in FIGURE 2. The pump 1 has adjustable displacement changing means 2 which is operated by fluid motor means 3. The displacement control 4 includes a jet discharge type single stage servovalve 5 which directs pressure fluid from a source of pressure 6 to the fluid motor means 3, through a by-pass or shut-off valve 7 controlled by a solenoid operated valve 8.

More specifically, pump 1 has a cylinder barrel 10, a port surface 11, inlet and outlet ports 12 and 13 and an operating shaft 14. Barrel 10 contains a plurality of parallel reciprocable pistons 16. The pistons 16 are constrained to run upon a conventional swash plate 15 carried on a hanger 17 which can be tilted or swung about trunnions 18 journalled in the pump housing 19 to permit the angle or inclination of swash plate 15 with respect to pistons 16 to be varied.

The hanger 17 has an integral arm or extension 22 terminating in a head 23 which is engaged by the fluid motor means or stroke control mechanism 3. The stroke control mechanism 3 operates to set the inclination angle of hanger 17, and hence of swash plate 15, with respect to pistons 16, thereby determining the stroke of pistons 16 and the rate and direction of fluid flow through pump 1.

Pump 1 is of the cross-center type, in which hanger arm 22 can be swung from one side of the centered, or zero stroke, position shown in FIGURE 1, to the other side thereof, causing the direction of fluid flow through the pump to be reversed for a given direction of rotation of shaft 14. However, it should also be understood that the invention can also be used with single side pump and motors, which can be adjusted only as to magnitude but not direction of flow. The pump 1 shown in FIGURE 2 is of the general type shown in Patent No. 3,250,227, to which reference may be had for a more complete description.

The jet discharge type electrohydraulic servovalve 5 which operates the fluid motor means 3 through the shut-off valve 7, has a rotationally displaceable armature 26 to which a torque of adjustable magnitude can be applied. This armature 26 urges a flexible or spring-like jet tube 27 selectively toward one or the other of two receiver or receptor ports 28 and 29 from its normal centered or null position between the ports. Jet tube 27 at its upper end is mechanically connected with the hanger 17 through trunnion 18, via an element or block 31 which is secured to the upper end of tube 27. The block 31 incorporates a slot 32 in which is precisely fitted a ball at the end of a spring or mechanically compliant force transmitting member 33 which is firmly attached to trunnion 18.

The jet discharge electrohydraulic servovalve 5 may suitably be of the type described in United States Patent No. 3,017,864 to Atchley. As shown in FIGURE 1, the servovalve 5 includes a polarized torque motor (generally at 34) receptive to an electrical current of controlled magnitude from electrical source 36 which may be conventional. The torque motor armature 26 is rotatable about an axis 40 and is connected to jet tube 27 to displace the latter as a spring through small excursions relative to the two receiver ports 28 and 29.

The spring 33 applies a mechanical feedback force to the jet tube varying with the position of the displacement changing means 2, for restoring the jet tube to a centered position between the two receiver ports 28 and 29 when the hanger has reached a position correlated to the electric current signal from electrical source 36.

Jet tube 27 has an inlet end 37 to which pressure fluid is supplied from pressure source 6. At its other end, jet tube 27 terminates in a jet nozzle 39 which passes through an aperture in a plate 41 mounted on the servovalve body 42. The jet nozzle 39 is closely adjacent receptor ports 28 and 29 and, when armature 26 is displaced from the centered position between the receptor ports in response to an electric signal, the jet of fluid issuing from nozzle 39 is divided unequally between ports 28 and 29, thereby creating a difference in the fluid pressures established at those ports.

Receptor ports 28 and 29 are connected by passageways 43 and 44 to a fluid pressure operated valve 7 which is of the spool type. Valve 7 controls the application of fluid from passageways 43 and 44 to the fluid rams 3. The valve 7 includes a spool 47 slidable in a bore 48 between end stops 51 and 52. Spool 47 has circumferential lands 53, 54 and 55 spaced along it which cooperate with spool bore 48 to define chambers 58, 59, 60 and 61. Bore 48 is provided with axially spaced inlet grooves or ports 63 and 64 from passageways 43 and 44, respectively, and also with axially spaced outlet grooves and ports 66, 67, 68, 69, and 70. Outlet grooves 66, 68 and port 70 are connected through a passageway 72 to a fluid reservoir or tank 73, to which the casing 42 of servovalve 5 is also connected via line 76. Ports 67 and 69 are connected via passageways 74 and 75, respectively, to two opposed equal area fluid rams which comprise the opposite stroke control mechanism 3. Stop 51 is dimensioned so that grooves 63 and 64 are blocked when grooves 66 and 68 are open.

The lands 53, 54 and 55 of spool 47 are positioned to direct pressure fluid from the jet nozzle 39 through the spool chambers 59 and 60 to stroke control mechanism 3 via passageways 74 and 75, or to close off ports 63 and 64 and dump the control pressure fluid to tank 3 via passageway 72.

Valve 7 is also provided with an end port 77 in chamber 58, and this port 77 communicates through a passageway 78 with the solenoid operated valve 8. Valve 8 has three ports, indicated at 79, 80 and 81. When its solenoid 83 is energized, valve 8 applies pressure fluid from port 80, to which pump 6 is connected via line 84, to port 79 and into valve chamber 58. Application of pressure in chamber 58 on the end surface of spool land 53 holds the spool 47 against stop 52 in the position shown in FIGURE 1, against the biasing action of a spring 85.

When solenoid 83 is de-energized, the spool of valve 8 is moved to connect port 79 to port 81 which leads to tank 73 via a line 86. In this condition port 80 is blocked against the application of pressure to port 79. This relieves the endwise pressure force on spool 47, permitting spring 85 to urge the spool against the other end stop 51. The pressure in line 84 from pressure source 6 is held constant by a relief valve 82 which spills excess fluid to tank.

The stroke control mechanism 3 includes a pair of opposed fluid rams or left and right stroking pistons 88 and 89 for engaging opposite sides of hanger arm head 23. Included with each stroking piston 88 and 89 in its respective cylinder is a centering or retract piston, designated as 90 and 91 respectively. The centering pistons 90 and 91 are slidable within the stroking pistons 88 and 89 with which they are associated, and are generally hat-shaped.

Pressure fluid from passageway 74 is applied behind left stroking piston 88 to urge it to the right, as viewed in FIGURE 1, toward head 23. Centering piston 90 incorporates a flange 93 which slides in enlarged end cavity 94 of cylinder 95, and is movable between shoulder 96 of cavity 94 and the cylinder end wall or stop 98. Centering piston 90 has an internal bore or chamber 99 carrying a relatively strong or double spring 100 which urges the centering piston toward engagement with cylinder shoulder 96. Pressure fluid from passageway 74 is applied into cylinder 95 between the annulus 101 at the end of left stroking piston 88 and the flange 93 of centering piston 90, thereby urging the centering piston 90 toward stop 98 and urging stroking piston 88 in the opposite direction toward head 23. Outer end 103 of stroking piston 88 engages hanger arm head 23 for clockwise displacement of hanger 17 about its pivot axis in response to an operating fluid pressure from passageway 74.

The opposed or right stroking piston 89 slides in a bore or cylinder 106 and has an effective cross-sectional area equal to that of left stroking piston 88. Piston 89 has an internal bore 114 in which the right centering piston 91 is slidable.

Centering piston 91 incorporates a flange or land 104 adapted to slide in cylinder 106, and is movable between end stop 105 and that point at which its flange 104 is arrested by the annular surface 108 formed by the end of right stroking piston 89. Centering piston 91 is provided with an internal bore or cavity 109 wherein a relatively weak spring 110 is disposed between cavity end surface 111 and end stop 105 of cylinder 106. This spring 110 urges piston 91 toward the left, as viewed in FIGURE 1. The cup-like right stroking piston 89 engages hanger arm head 23 on the opposite side from the left stroking piston 88. Both the stroking pistons 88 and 89 and the centering pistons 90 and 91 are suitably sealed to the bores in which they slide as shown in FIGURE 1. The internal bores 99 and 109 of the centering pistons 90 and 91 respectively are connected to drain lines.

In describing the operation of this control mechanism let it be assumed that at the start the hanger 17 of pump 1 is in the centered position shown in FIGURE 1, corresponding to substantially zero displacement of the pump pistons 16, and that the pressure source 6 is supplying pressure fluid to line 84 and to the inlet 37 of servovalve 5.

Pressure from source 6 is communicated through line 84 to port 80 of solenoid operated valve 8. If solenoid 83 is energized, the pressure at port 80 is applied through the valve 8 into chamber 58 of the valve 7, in which it acts on the end surface of spool land 53, holding the spool against end stop 52.

When no signal is applied from electrical source 36, servovalve 5 is at null and the jet of fluid issuing from nozzle 39 of jet tube 27 impinges equally on receptor ports 28 and 29, thereby establishing equal pressures at those ports.

The pressures at receptor ports 28 and 29 are communicated through passageways 43 and 44 and chambers 59 and 60 respectively of the valve 7 into passageways 74 and 75 through which they are applied to the annular end surface areas 101 and 108 of the left and right stroking pistons 88 and 89 respectively. Since these annular areas are equal, the equal pressures establish equal forces on the pistons 88 and 89, thereby maintaining hanger 17 in the initial or centered position. The pressures in cylinders 95 and 106 act on the flanges 93 and 104 of the centering pistons 90 and 91 respectively, and are of sufficient magnitude to overcome the forces of springs 100 and 110 and retract the respective centering pistons against their end stops 98 and 105.

The control is actuated by applying to torquemotor 34 a differential current from electrical source 36 having a magnitude and polarity corresponding to the direction and magnitude of desired fluid flow through pump 1. This signal causes the torquemotor 34 to create an electromagnetic field about armature 26 which turns the armature about its axis 40. Assuming that the polarity of the field is such that the armature 26 is turned in a clockwise direction, a disproportionate portion of the jet of hydraulic fluid will thereby be directed toward the left receptor port 28, increasing the pressure of fluid at port 28 and in passageway 43 relative to that at port 29 and in passageway 44.

The differential pressures in passageways 43 and 44 is communicated across chambers 59 and 60 of valve 7 and into passages 74 and 75. A larger pressure will now act on the annular area 101 of left stroking piston 88 than on the annular area 108 of right stroking piston 89, hence head 23 is urged to the right or in the clockwise direction about trunnions 18. Fluid in cylinder 106 behind annulus 108 is displaced through the servovalve to tank as the right stroking piston 89 is displaced into its cylinder 106. Fluid pressure and/or the force of spring 110 maintains piston 89 in engagement with head 23, thus freeing the stroking mechanism of backlash.

As the hanger turns about the trunnions its motion is transmitted or fed back through the resilient spring member 33 to the upper end of jet tube 27 directly through member 31. This forces opposes and tends to counteract the electromagnetic torque acting in the clockwise direction on armature 26 and tends to deflect the jet tube in the opposite direction, that is, toward the position in which the jet tube is more nearly centered between receptor ports 28 and 29. As the hanger continues to be moved, the magnitude of this mechanical feedback force increases, until the mechanical feedback force applied to the jet tube through spring 33 is of sufficient magnitude that the jet tube is restored to centered position between the receptor ports.

At this time the difference between the pressure acting on the end areas 101 and 108 of the stroking pistons is equalized and the movement of the displacement changing means ceases. The new position of the hanger will be maintained so long as the same signal from electrical source 36 continues to be applied to the torquemotor 34.

From the foregoing it will be seen that for an electric signal of given magnitude there corresponds a certain hanger position which is maintained by the control. The operation of the device is the same in response to an electrical signal of opposite polarity, but in this case armature 26 will be rotated in the counterclockwise direction, pressure in line 44 will exceed that in line 43, and the hanger will be moved in the counterclockwise direction.

In the event of electrical system failure, solenoid 83 of valve 8 is de-energized. This causes chamber 58 to be connected directly to tank through port 81, thereby relieving the pressure force on the end land 53 of the spool. Spring 85 moves the spool 47 to the left so that lines 28 and 29 are blocked. Spool leakage is directed to tank 73 via ports 66, 68 and 70. When fluid flow from jet nozzle 39 is blocked, spool 47 is in such a position as to release the pressures in cylinders 95 and 106 to tank via ports 66 and 68. With release of pressures in cylinders 95 and 106, spring 100 moves centering piston 90 to the position at which its flange 93 engages cylinder shoulder surface 96. The centering piston is so dimenisioned that when its flange 93 engages shoulder 96, left stroking piston 88 is moved by piston 90 to a position in which head 23 is centered. The right centering piston 91 is urged by its spring 110 to a position in which it moves right stroking piston 89 against head 23. Inasmuch as the force of spring 100 exceeds the force of spring 110, the right stroking piston holds the head 23 against the end of piston 88 in the center position, but does not move piston 88. In this manner, the control responds to electrical system failure to restore the pump to center position in which its displacement is zero.

In the event of hydraulic system pressure failure, pressure in chamber 58 falls, spool valve element 47 moves to the left, and the operation of the elements is similar to that just described, the centering pistons 90 and 91 causing the hanger to be moved to center position.

Where an especially high pressure gain is required to operate the displacement changing means, a two stage jet servo-valve may be used to supply the necessary pressure fluid, with a first stage similar to the previously described herein.

As can be seen in FIGURE 2 of the drawings, the actual space requirements of the control of this invention are small in relation to the size of the overall pump with which the control is used. Moreover, the use of a direct mechanical feedback avoids the necessity of transducing a hanger position-related signal to an electric signal. This provides for high reliability and avoids the attendant complexity of electrical feedback.

Having described my invention, what I claim is:
1. Structure comprising,
   a variable displacement hydraulic pressure energy translating device having movable displacement changing means and including a pair of opposed fluid motors for moving and positioning said displacement changing means,
   a jet discharge electrohydraulic servovalve including a pair of adjacent receptor ports, an armature operated by a torque motor, a resilient jet tube having a nozzle at one end thereof and fixedly mounted at a point spaced from said end, said tube displaceable as a spring by said armature about said point for adjustably dividing a jet stream from said nozzle between said receptor ports,
   means for supplying pressure fluid to said jet tube,
   passageways connecting said receptor ports with the respective fluid motors for supplying pressure fluid to said fluid motors from said receptor ports,
   spring means separate from said armature and tube connected between said displacement changing means and said jet tube for increasingly urging said tube toward a null position between said receptor ports as said displacement changing means is moved away from the no displacement position thereof,
   and shut-off valve means in said passageways responsive to loss of pressure in said means for supplying pressure fluid to said jet tube to release pressure fluid on said motors.

2. The structure of claim 1 wherein said displacement changing means is rotatable about a trunnion and said spring means is connected between said trunnion and said jet tube.

3. The structure of claim 2 wherein said nozzle and the connection of said spring means to said jet tube are on opposite sides of said armature from one another.

4. The structure of claim 1 wherein said valve means is operated by hydraulic pressure acting on a control surface thereof to permit pressure from said servovalve to be applied to operate said motors, and said valve means is opposingly spring biased toward a position releasing pressure in said passageways.

5. The structure of claim 4 wherein the said hydraulic pressure is applied to said control surface of said valve means through an electrically operated cut-off valve which discharges said hydraulic pressure in response to electrical failure.

6. The structure of claim 1 wherein the respective fluid motors include opposed pistons having equal areas exposed to pressure from said passageways.

7. The structure of claim 6 wherein the respective fluid motors also include spring operated centering means for moving said displacement changing means to said no displacement position when pressure in both said passageways is released.

8. Structure comprising,
   a variable displacement fluid pressure energy translating device having trunnion mounted rotatable displacement changing means,
   a jet discharge operated valve including a pair of receptor ports, a jet tube having an outlet nozzle and adjustably displaceable as a spring from a null position for dividing the jet discharge stream therefrom between said receptor ports,
   means for supplying pressure fluid into said jet tube,
   a pair of opposed fluid motors, each motor tending to rotate said displacement changing means in response to pressure applied thereto,
   spring centering means biasing said displacement changing means toward a centered position,
   passageways connecting said receptor ports with the respective fluid motors for supplying pressure fluid to the respective fluid motors from said receptor ports, the said passageways including valve means for relieving pressure on said fluid motors in response to a control failure,
   and a resilient spring engaged between the trunnion mounting of said displacement changing means and a point on said jet tube spaced from said nozzle for urging said tube toward said null position as said displacement changing means is moved by said fluid motors in response to unequal division of said jet discharge stream between said receptor ports.

9. The structure of claim 8 wherein said spring is fixedly secured to the trunnion mounting of said displacement changing means and engages said tube through a ball and slot joint.

10. The structure of claim 8 wherein said jet tube includes a member mounted thereto providing a socket for engaging an end of said spring, said member being secured to said jet tube remotely from the point at which said stream issues therefrom.

11. The structure of claim 10 wherein said tube is fixed at one end and is angularly displaceable about said one end by a torquemotor armature for dividing said stream between said receptor ports.

References Cited

UNITED STATES PATENTS

| | | | |
|---|---|---|---|
| 2,981,273 | 4/1962 | Callender | 137—83 |
| 3,017,864 | 1/1962 | Atchley | 91—3 |
| 3,019,805 | 2/1962 | Gordon | 137—83 |
| 3,065,735 | 11/1962 | Chaves | 91—387 |
| 3,131,603 | 5/1964 | Hadekel | 91—445 |
| 3,176,590 | 4/1965 | Uhtenwoldt | 91—45 |
| 3,186,310 | 6/1965 | Neff | 103—162 |
| 3,270,623 | 9/1966 | Gasnjost | 91—411 |
| 3,282,283 | 11/1966 | Takeda | 91—3 |
| 3,302,585 | 2/1967 | Adams | 103—162 |
| 3,331,383 | 7/1967 | Buchanan | 91—3 |
| 3,338,136 | 8/1967 | Jerome | 91—3 |

PAUL E. MASLOUSKY, *Primary Examiner.*

U.S. Cl. X.R.

91—199, 387, 445, 447; 103—162; 137—83